US008880200B2

(12) United States Patent
Nowel

(10) Patent No.: US 8,880,200 B2
(45) Date of Patent: Nov. 4, 2014

(54) ASSOCIATING USER PREFERENCES WITH ELEVATOR ACTIVITY

(75) Inventor: Edward Nowel, Columbia, NJ (US)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 13/464,720

(22) Filed: May 4, 2012

(65) Prior Publication Data

US 2013/0297093 A1 Nov. 7, 2013

(51) Int. Cl.

*G05B 11/01* (2006.01)
*G05B 15/00* (2006.01)
*B66B 1/28* (2006.01)
*B66B 1/16* (2006.01)
*B66B 1/34* (2006.01)

(52) U.S. Cl.

USPC ............... 700/19; 700/83; 187/247; 187/381; 187/388; 187/396

(58) Field of Classification Search

CPC ....................................................... B66B 1/468
USPC ............ 705/1.1, 14.1, 51; 187/247, 381, 388, 187/391, 392, 396; 700/17, 19, 83, 276, 700/277; 704/275
See application file for complete search history.

(56) References Cited

U.S. PATENT DOCUMENTS 5,704,017 A * 12/1997 Heckerman et al. ............ 706/12
6,382,363 B1 5/2002 Friedli
7,319,966 B2 * 1/2008 Friedli et al. .................. 705/346
8,151,943 B2 * 4/2012 de Groot ....................... 187/382
8,285,553 B2 * 10/2012 Gazdzinski ................... 704/275
2002/0020586 A1 2/2002 Bauer et al.
2003/0177097 A1 * 9/2003 Friedli et al. .................... 705/51
2007/0168205 A1 * 7/2007 Carlson et al. .................... 705/1
2007/0214492 A1 9/2007 Gopi et al.
2008/0281472 A1 * 11/2008 Podgorny et al. ............. 700/276
2010/0082569 A1 4/2010 Cresto et al.
2010/0147226 A1 6/2010 Tsengas
2010/0235004 A1 * 9/2010 Thind ........................... 700/277
2011/0046805 A1 * 2/2011 Bedros et al. ................. 700/291
2012/0158203 A1 * 6/2012 Feldstein ...................... 700/295
2013/0234840 A1 * 9/2013 Trundle et al. ............. 340/12.53

FOREIGN PATENT DOCUMENTS

WO WO 02/25624 A1 3/2002
WO WO-2007/036057 A1 4/2007

OTHER PUBLICATIONS

International Search Report and the Written Opinion of the International Searching Authority dated Jul. 22, 2013 issued in PCT/EP2013/059075.

* cited by examiner

*Primary Examiner* — Darrin Dunn
(74) *Attorney, Agent, or Firm* — Stroock & Stroock & Lavan LLP

(57) ABSTRACT

A user can be detected and identified at or near an elevator installation. A record for the user can be read from a database, and based on information in the record, a personalized building action can be performed for the user. A portion of the building can thus be "prepared" for the user.

18 Claims, 5 Drawing Sheets

ASSOCIATING USER PREFERENCES WITH ELEVATOR ACTIVITY

FIELD

This disclosure relates to the use of information associated with elevator passengers.

BACKGROUND

People often use elevators to travel to different areas of a building. For example, a passenger may travel in an elevator to a restaurant, gym or parking garage. Some elevator systems identify a passenger before the passenger boards the elevator car.

SUMMARY

A user can be detected and identified at or near an elevator installation of a building. A record for the user can be read from a database, and based on information in the record, a personalized building action is performed for the user. A portion of the building can thus be "prepared" for the user.

In some embodiments, a method for an elevator system comprises: identifying a passenger of an elevator system of a building; determining a personalized building action associated with the elevator passenger based on a record for the passenger in a database; and sending one or more instructions for the personalized building action to one or more building components in a room of the building, the room of the building being outside of the elevator system. The method can further comprise updating the record for the passenger based on input provided in the room of the building. The identifying of the passenger can be performed based on information received for a destination call of the passenger. The personalized building action can comprise a food or drink order, a temperature setting for the room in the building, a lighting setting for the room in the building, a multimedia setting for the room in the building, a sending of a message to a person in the room of the building, a reserving a use of one or more machines for the passenger, and/or a displaying personalized advertising for the passenger. The identifying the passenger can be performed by an elevator control unit. The sending the one or more instructions for the associated building action can be performed by a building control unit.

In further embodiments, an elevator system for a building comprises: a computer-based elevator control unit; a computer-based service provider unit; and a database containing a record for an elevator user, the database being coupled to the elevator control unit and the service provider unit, the service provider unit being programmed to receive one or more instructions from the database based on the record for the elevator user, and to perform one or more personalized building actions for the elevator user. The service provider unit can be further programmed to update the record for the elevator user based on input provided to the service provider unit. The service provider unit can comprise a computer-based building control unit and an appliance or an environmental component. In some cases, the database is remotely located from the elevator control unit or the service provider unit. In further cases, the elevator control unit is in a first building and the service provider unit is in a second building.

In additional embodiments, one or more computer-readable storage media have encoded thereon instructions that, when executed by one or more processors, cause the one or more processors to perform a method, the method comprising: identifying a passenger of an elevator system of a building; determining a personalized building action associated with the elevator passenger based on a record for the passenger in a database; and sending instructions for the associated building action to a building component in a room of the building. The method can further comprise updating the record for the passenger based on input provided in the room of the building.

In still further embodiments, one or more computer-readable storage media have encoded thereon instructions that, when executed by one or more processors, cause the one or more processors to perform a method, the method comprising: receiving, from a database, an indication of a personalized building action for an elevator passenger; sending a command to an environmental component or an appliance based on the indication of the personalized building action; receiving update information from the elevator passenger for the personalized building action; and sending the update information to the database

DETAILED DESCRIPTION

Figure 1:
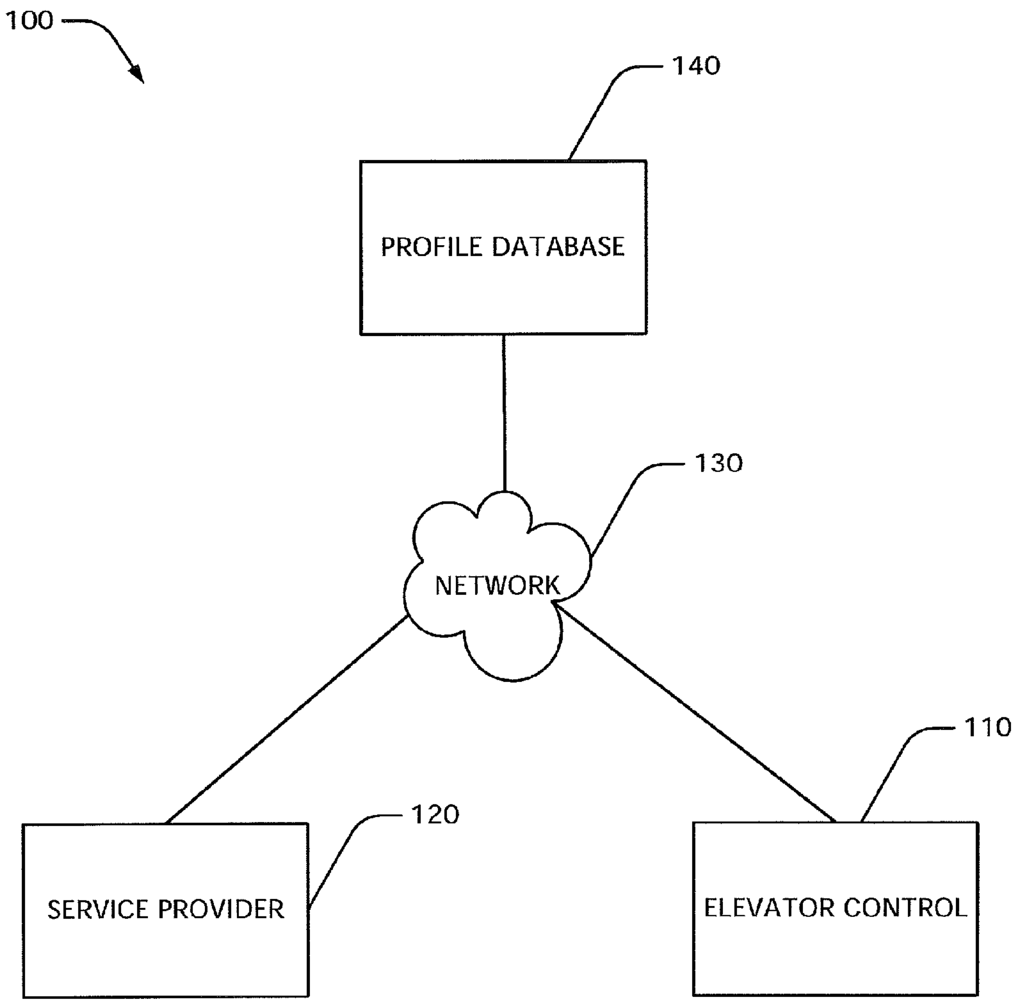
FIG. 1 shows a block diagram of an exemplary embodiment of a system for controlling components based on elevator user activity.

Disclosed below are embodiments of elevator control and building control technologies and/or related systems and methods. The embodiments should not be construed as limiting in any way.

Instead, the present disclosure is directed toward all novel and nonobvious features and aspects of the various disclosed methods and systems, and equivalents thereof, alone and in various combinations and sub-combinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth herein. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "receive," "update" and "identify" to describe the disclosed technologies. These and other terms are high-level abstractions of the actual operations that are performed. The actual operations that correspond to these terms may vary depending on the particular implementation and are readily discernible by one of ordinary skill in the art.

Any of the methods described herein can be performed using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (networked, for example, via the Internet, a wide-area network, a local-area network, a client-server network, or other such network). Computer-readable storage media do not include embodiments that are pure transitory signals.

For clarity, only selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware. Portions of one or more disclosed methods can be executed by different parts of a distributed computing environment.

Additionally, intermediate or final results (e.g., one or more user settings) created or modified using any of the disclosed methods can be stored on one or more computer-readable storage media.

Furthermore, any of the software embodiments (comprising, for example, computer-executable instructions for causing a computer to perform any of the disclosed methods) can be transmitted, received, or accessed through a suitable communication means. Similarly, intermediate or final method results, created or modified using any of the disclosed methods, can be transmitted, received, or accessed through a suitable communication means.

Various embodiments of one or more electronic devices can be used with at least some of the disclosed technologies, including a handheld computing device (e.g., a personal digital assistant (PDA), a cell phone, a smartphone, a portable music or video player) and a personal computer (e.g., a desktop computer, a laptop computer, a netbook, a server, a thin client). At least some electronic devices can be configured to receive data from and/or transmit data to a network (e.g., a wireless network, the Internet).

FIG. 1 shows a block diagram of an exemplary embodiment of a system 100 for controlling components based on elevator user activity. The system 100 comprises an elevator control unit 110 and a service provider unit 120. Each of the units 110, 120 comprises a computer-based device with a processor and a computer-readable storage medium. The system 100 further comprises a profile database 140, which stores user preferences for elevator system users. The units 110, 120, 140 are communicatively coupled through a network 130. The network 130 can comprise the Internet, a wide-area network, a local-area network, a client-server network, a wireless network, and/or another type of network. The elevator control unit 110 is coupled to an elevator system (not shown). The service provider unit 120 performs one or more actions based on information received from the elevator control unit 110 and the profile database 140. Examples of such actions are described below.

Although the units 110, 120, 140 are shown as discrete components, in some embodiments two or more of these units operate as one component (e.g., two or more of these units are run on the same computer).

In some embodiments, the elevator control unit 110, the service provider unit 120 and the profile database 140 are located in a single building. In further embodiments, at least one of the elevator control unit 110, the service provider unit 120 and the profile database 140 is located remotely from the other two components. The system 100 can thus be a distributed system.

In particular embodiments, all components of the system 100 are owned by a single party. In further embodiments, ownership of the components of the system 100 is divided among two or more parties. One of the parties may provide use of a given component as part of a service arrangement.

Figure 2:
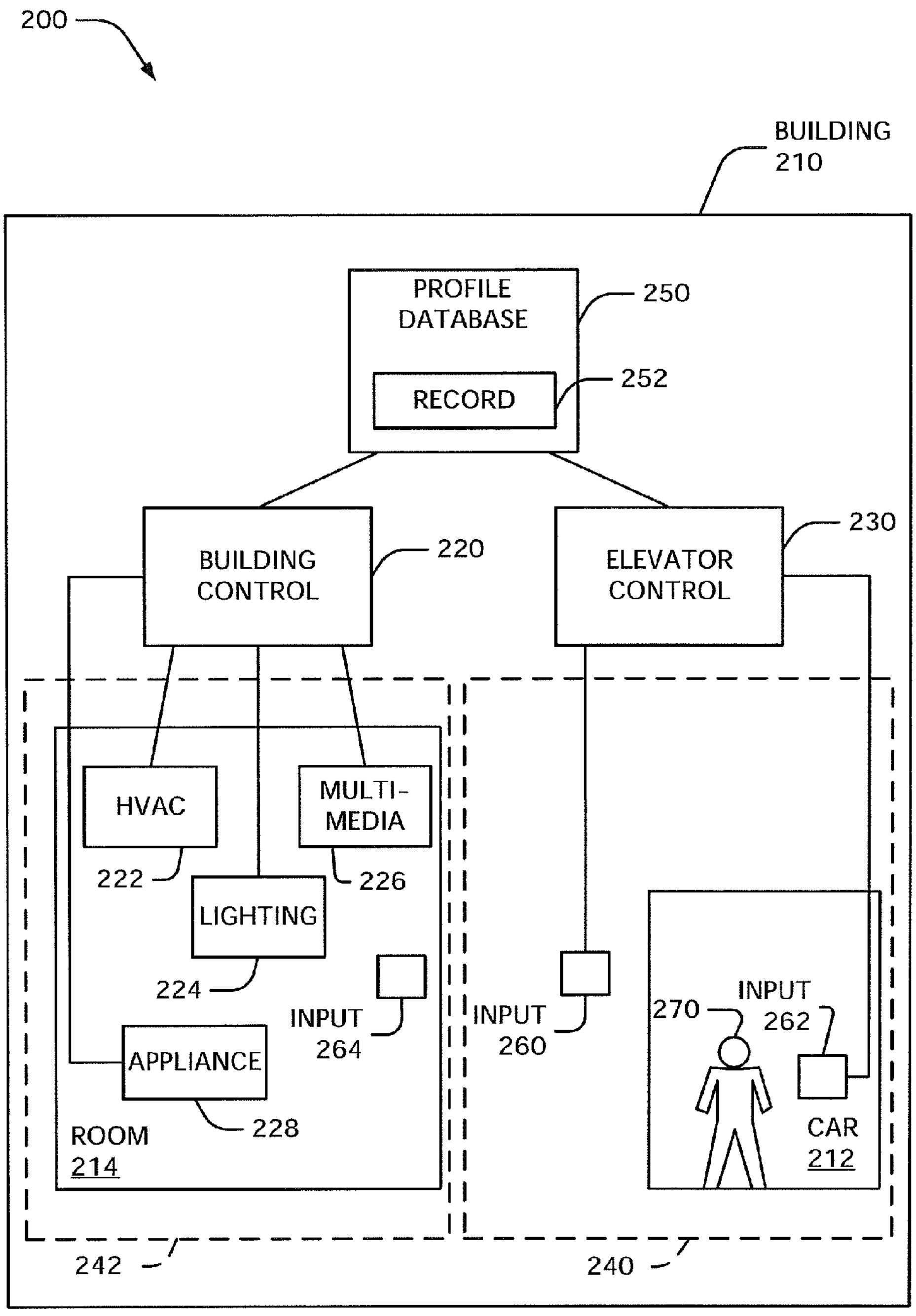
FIG. 2 shows a block diagram of another exemplary embodiment of a system for controlling components based on elevator user activity.

FIG. 2 shows a block diagram of a further exemplary embodiment of a system 200 for controlling components based on elevator user activity. The system 200 is one possible version of the system 100, described above. At least a portion of the system 200 is located within a building 210. The system 200 comprises a building control unit 220 and an elevator control unit 230. Each of the units 220, 230 comprises a computer-based device with a processor and a computer-readable storage medium.

In some embodiments, the building control unit 220 comprises a centralized building computer system. The building control unit 220 can also comprise a building security system and/or an environmental automation control system. In further embodiments, the building control unit 220 stores information about particular users and/or occupants (e.g., persons or businesses) of the building 210. In some embodiments, the building control unit 220 comprises a centralized computer, while in other embodiments the unit 220 comprises a set of distributed (but connected) computer systems.

The building control unit 220 can be coupled to and can control the operation of one or more environmental components, which make up a set of building components 242. Environmental components are generally devices that serve an area, such as a room 214, by altering some environmental aspect of the area. In various embodiments, examples of environmental components include (but are not limited to): an HVAC device 222, which can include a heating, ventilation and/or air conditioning device for at least a portion of the building 210, and one or more sensors (e.g., temperature sensors); a lighting device 224 (e.g., a lamp), which can provide lighting for at least a portion of the building 210; and/or a multimedia device 226, which can include, for example, audio and/or video devices for at least a portion of the building 210.

The building control unit 220 can be further coupled to one or more appliances 228, which can be included in the set of building components 242. An appliance is generally a device that provides a service to and/or on behalf of a user 270. In various embodiments, the appliances 228 can comprise, for example: vending machines for food and/or beverages; occupancy sensors; a messaging device for communicating information to one or more persons and/or machines; and/or machines for processing orders for food and/or beverages.

Although the environmental components are depicted in FIG. 2 as being inside the room 214, in some embodiments one or more respective environmental components are located outside of the room 214. Additionally, although the appliance 228 is shown as being inside the room 214, in some embodiments one or more appliances are located outside of the room 214. In particular embodiments, the appliance 228 or the environmental component is temporarily in the room 214 (e.g., it can be brought to the room 214 as needed to provide a given service).

Returning briefly to the system 100 of FIG. 1, in at least some cases the service provider unit 120 comprises the building control unit 220 of FIG. 2 and one or more of the devices 222, 224, 226, 228, 264 shown in FIG. 2.

Although FIG. 2 depicts only one room 214, in various embodiments the system 200 can serve multiple rooms in the building 210. The rooms can include, for example, offices, apartments, retail areas, gyms, transport facilities (e.g., parking garages) and/or eating areas (e.g., cafeterias or restaurants). Each of these rooms can have one or more respective environmental components and/or appliances coupled to the building control 220. However, in at least some embodiments, not every room in the building 210 has environmental components and/or appliances coupled to the building control 220.

In some embodiments, the elevator control unit 230 is part of the elevator controller hardware that handles various tasks of the elevator system, such as processing calls, operating doors and/or analyzing traffic data. In further embodiments, the control unit 230 is a computer-based unit that is separate from (but communicatively coupled to) the elevator controller hardware.

The elevator control unit 230 is coupled to and can control the operation of one or more components of an elevator system 240 that serves the building 210. For clarity, at least some of these components are not shown in FIG. 2.

The building control unit 220 and the elevator control unit 230 are both coupled to a profile database 250, which is similar to the profile database 140 of system 100. The database 250 comprises at least one computer-readable storage medium and stores one or more records 252, each of which is associated with a given user 270. In some embodiments, a record 252 (also called a "profile") is associated with two or more users. In further embodiments, the record 252 is associated with users who belong to a group or to an organization associated with the building 210 (e.g., employees of an occupant of the building 210). The records 252 indicate one or more user preferences for the associated users. For example, the preferences can indicate: a temperature or temperature range preferred or required by the user; lighting levels preferred or required by the user; music, video or other multimedia content preferred or required by the user; food and/or drink orders preferred by the user; transportation information for the user; and/or marketing preferences for the user. In various embodiments, the preferences stored by the records 252 can indicate positive preferences (e.g., "likes") and/or negative preferences (e.g., "dislikes"). For example, a record can indicate that its associated user prefers a food order of Chinese food, or that the user dislikes Mexican food and thus prefers a food order having any food besides Mexican food. In some embodiments, the database 250 is incorporated into the building control unit 220 and/or into the elevator control unit 230.

In various embodiments, the record 252 for a user can be created in one or more various ways. For example, the user 270 can create the record 252 by selecting from one or more pre-determined options. The pre-determined options can be set by another party, such as a building manage or owner, or by an employer. The user can enter the selection information through an electronic input device. In some embodiments, the database 250 identifies patterns in the preferences of the user 270 (e.g., desired temperature, drink selection) and, based on this history of preferences, creates the record 252.

Although a user (also sometimes called a passenger, visitor, or occupant) can be a person, in various embodiments the user 270 can also be multiple people, a machine, an animal, and/or another object.

The system 200 further comprises one or more input devices 260, 262, which are coupled to the elevator control unit 230. In the depicted embodiment, the input device 260 is located outside of the car 212 (e.g., near an elevator entrance, in a hallway of the building 210, in a room of the building 210). In the depicted embodiment, the input device 262 is located in the elevator car 212. The input devices 260, 262 can comprise, for example, a keypad, a touchpad, a computing device and/or a portable electronic device (e.g., a remote control, a mobile telephone, a smartphone, a personal digital assistant). In particular embodiments, the input device 260 comprises a destination call input terminal, which allows a passenger to indicate a destination (passively and/or actively) before entering an elevator car. In some embodiments, the input device 262 comprises a car panel, which allows a passenger to indicate a destination from within the car 212.

In some embodiments, only one of the input devices 260, 262 is present. In further embodiments, one or more additional input devices are coupled to the elevator control unit 230.

In additional embodiments, an additional input device 264 is located in or near the room 214. The input device 264 is coupled to the building control 220 (although for clarity this connection is not explicitly shown in FIG. 2). Use of the input device 264 is described below.

The elevator control 230 can at least partially determine the location and the identity of the user 270. For example, the location of the user 270 can be determined well enough to establish that the user 270 is in the car 212. In some embodiments, the user location and identity is established at least in part by detecting the presence of an identification device borne by the user 270. The identification device can comprise, for example, a radio-frequency identification (RFID) tag (including near-field and far-field devices), a magnetic storage device (e.g., magnetic strip card), an optical code device, and/or another device. In further embodiments, the user location is established based on an input provided by the user 270 at, for example, the input device 260, 262. For example, the input device 260, 262 can read a biometric feature from the user 270 (e.g., a fingerprint, an iris scan, a voice print and/or other feature). The input device 260, 262 can also receive a code (e.g., a personal identification number (PIN) code) from the user 270. In particular embodiments, the user location is based on a signal from a portable electronic device borne by the user 270.

In some embodiments, the user 270 is identified on an individual level, while in further embodiments the user is identified as a member of one or more groups of users.

In some embodiments, one or more components of the system 200 are located remotely from the building (e.g., the profile database 250 is located remotely). Remote components can exchange information with components at the building 210 over one or more networks (not shown). In further embodiments, all of the components of the system 200 are located within the building 210. In some cases, the building control unit 220 and the elevator control unit 230 are located in separate buildings.

Figure 3:
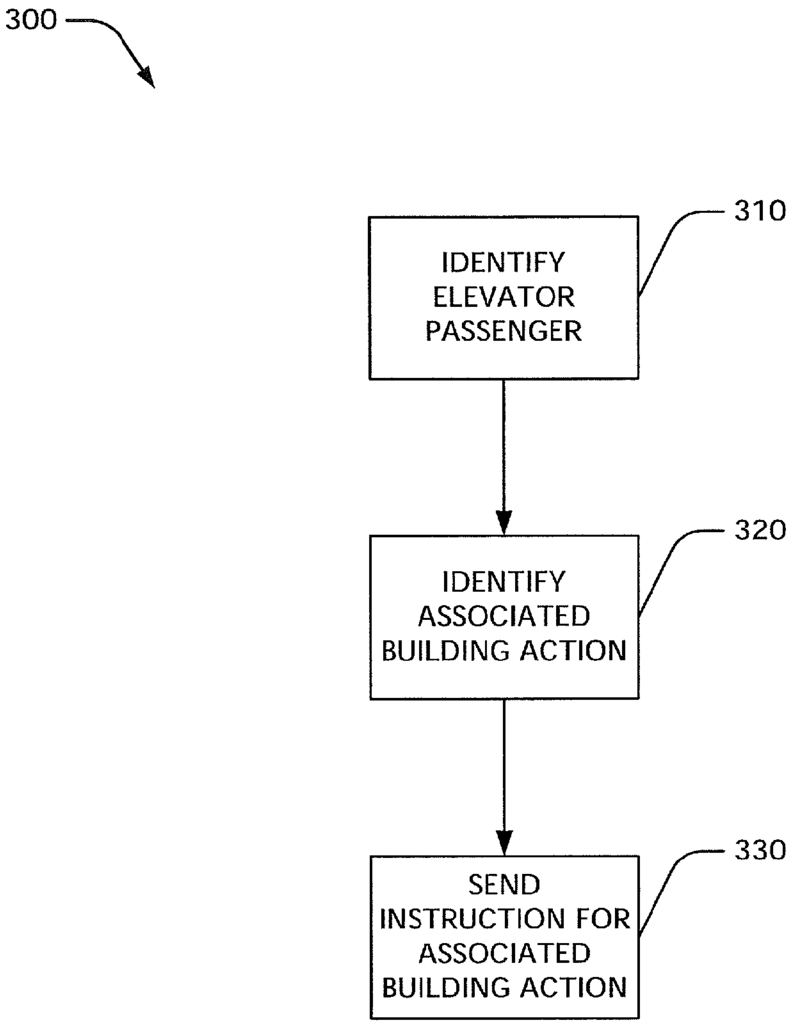
FIG. 3 is a block diagram of an exemplary embodiment of a method for using user preferences in conjunction with elevator activity.

FIG. 3 is a block diagram of an exemplary embodiment of a method 300 for using user preferences in conjunction with elevator activity. (Although the method 300 is described here in the context of the system 200, the method 300 can also be used with other embodiments, including the system 100.) In a method act 310, an elevator passenger 270 is identified. The passenger 270 is identified based on identifying information received by, for example, one or more of the input devices 260, 262. In some embodiments, the identifying information can be passively read by the input device 260, 262 from, for example, a data-carrying device (e.g., an RFID card or other device) borne by the user 270. In further embodiments, the identifying information is actively input into the input device 260, 262 by the user 270. For example, the identifying information can be typed into a keypad on the input device 260, 262. The method act 310 can be at least partially performed by the elevator controller 230.

In a method act 320, an associated, personalized building action for the passenger is determined. A "building action" is an action carried out by a building component, such as an environmental component or an appliance 228. In various embodiments, building actions can include, for example: placing a food or drink order in a food management system in an eating area; displaying a particular video segment on a video system; playing a particular audio segment on an audio system; changing the temperature or lighting in a room; informing a passenger how many people are in a given area, such as a restaurant or gym; placing a reservation for a passenger (e.g., at an eating area, at a gym); reserving a piece of equipment for a passenger (e.g., a car, an exercise device); sending a message (e.g., informing someone, such as an assistant or office manager, of the passenger's arrival); and/or turning on a passenger's computer or other device. The building action is determined based on one or more user records 252 that are stored in the profile database 250. The one or more user records 252 are selected based on the identity of the passenger 270. In some cases, the method act 320 is at least partially performed by the elevator control unit 230. In some cases, the method act 320 is at least partially performed by the building control unit 220.

In a method act 330, one or more instructions are sent to cause the associated building action to be performed by the corresponding building component. The method act 330 can be at least partially performed by, for example, the building control unit 220.

Figure 4:
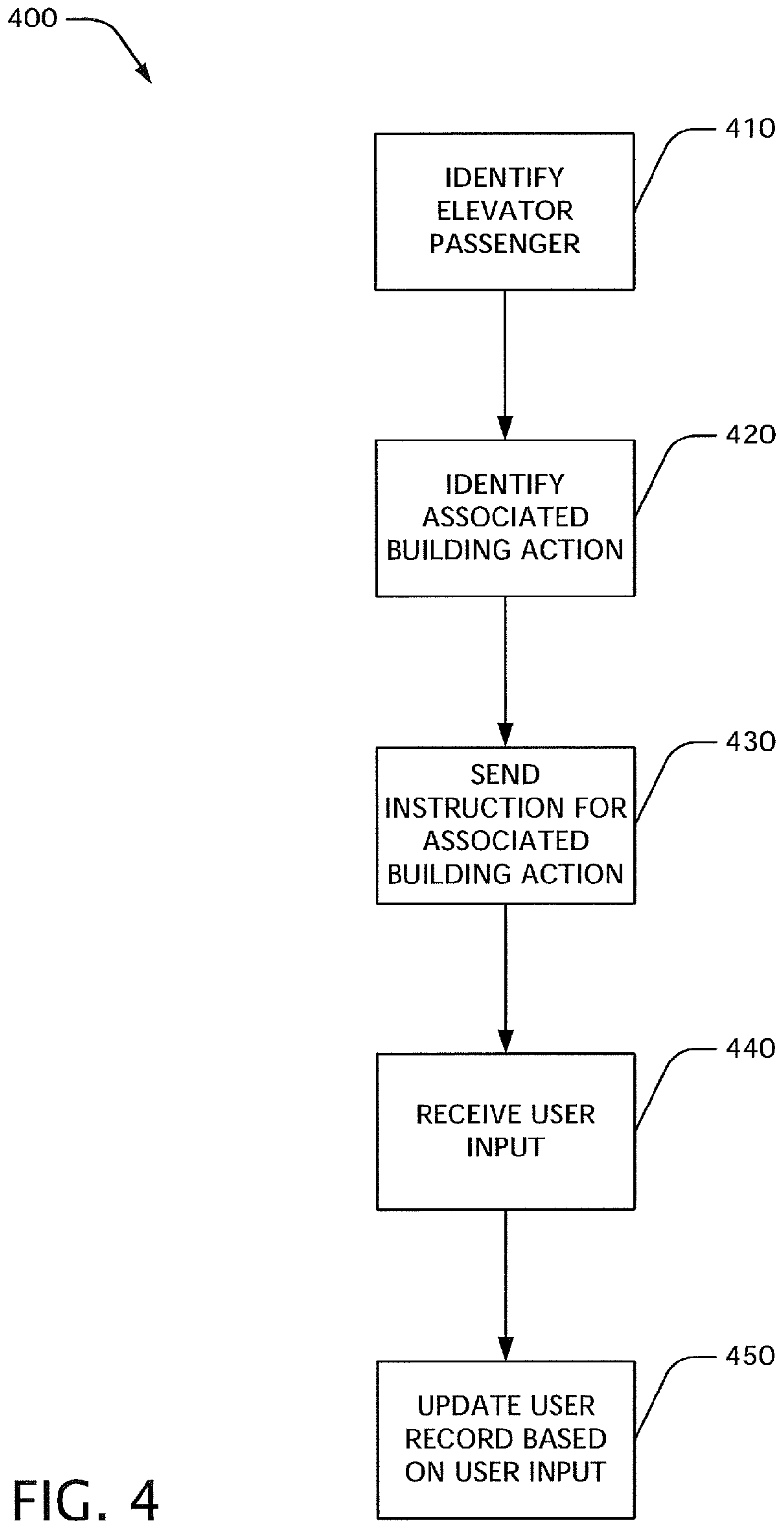
FIG. 4 is a block diagram of another exemplary embodiment of a method for using user preferences in conjunction with elevator activity.

FIG. 4 shows a block diagram of another exemplary embodiment of a method 400 for applying user preferences in conjunction with elevator activity. (Although the method 400 is described here in the context of the system 200, the method 400 can also be used with other embodiments, such as the system 100.) In a method act 410, an elevator passenger 270 is identified. The passenger 270 is identified based on identifying information received by, for example, one or more of the input devices 260, 262. In some embodiments, the identifying information can be passively read by the input device 260, 262 from, for example, a data-carrying device (e.g., an RFID card or other device) borne by the user 270. In further embodiments, the identifying information is actively input into the input device 260, 262 by the user 270. The method act 410 can be at least partially performed by the elevator controller 230.

In a method act 420, an associated, personalized building action for the passenger is determined. The building action is determined based upon one or more user records 252 that are stored in the profile database 250. The one or more user records 252 are selected based on the identity of the passenger 270. In some cases, the method act 420 is at least partially performed by the elevator control unit 230. In some cases, the method act 420 is at least partially performed by the building control unit 220.

In a method act 430, one or more instructions are sent to cause the associated building action to be performed by the corresponding building component. The method act 430 can be at least partially performed by, for example, the building control unit 220.

In a method act 440, user input is received by the building control 220 through the input 264. The user input can indicate, for example, a user's wishes for an action carried out by a building component. In some embodiments, this building component is the same as that to which the one or more instructions are sent in the method act 430; in further embodiments, the building component is another building component. The user input can indicate, for example: that the user 270 wishes to modify a food order that has been placed by an appliance 228; that the user 270 wishes to modify the room temperature; that the user 270 wishes to change the video and/or music being presented by a multimedia device 226; that the user 270 prefers a certain piece of exercise equipment; and/or that the user 270 wishes to change the lighting in the room 214.

In a method act 450, the one or more user records 252 are updated based on the user input received in the method act 440. For example, the records 252 can be updated to reflect a change in the user's preferences for food orders, HVAC settings, lighting settings, equipment settings and/or multimedia settings. The updated settings stored in the one or more user records 252 can be used to instruct building components for performing later building actions. The method act 450 can be at least partially performed by the building control unit 220.

Figure 5:
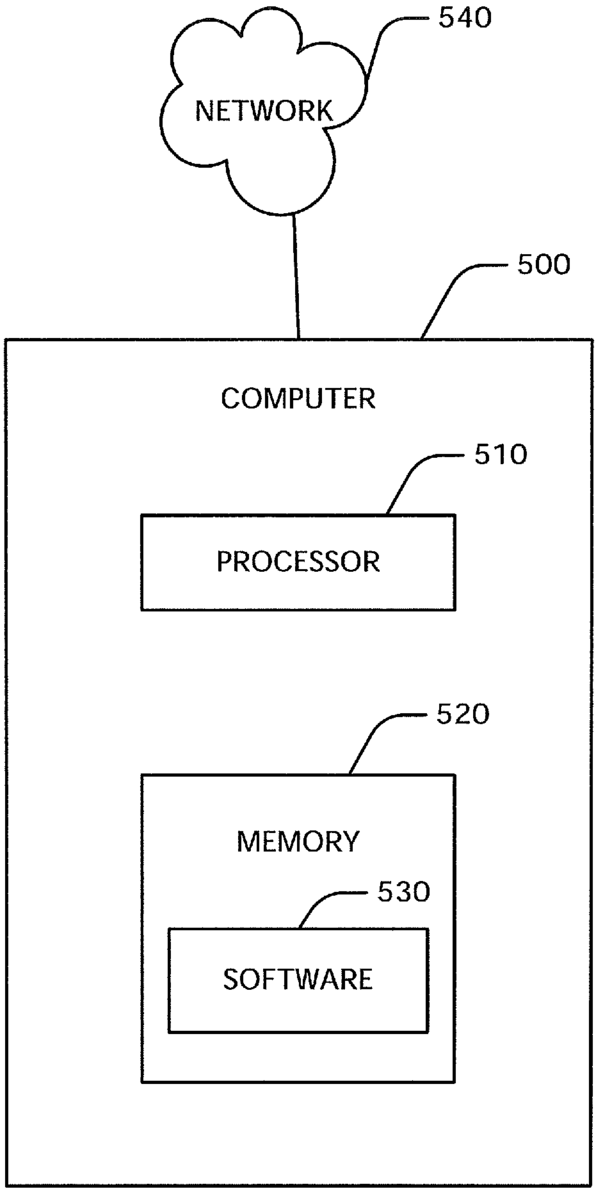
FIG. 5 shows a block diagram of an exemplary embodiment of a computer.

FIG. 5 shows a block diagram of an exemplary embodiment of a computer 500 (e.g., part of an elevator control unit, part of a building control unit) that can be used with one or more technologies disclosed herein. The computer 500 comprises one or more processors 510, which can comprise physical processors and/or virtual processors. The processor 510 is coupled to a memory 520, which comprises one or more computer-readable storage media storing software instructions 530. When executed by the processor 510, the software instructions 530 cause the processor 510 to perform one or more method acts disclosed herein. Further embodiments of the computer 500 can comprise one or more additional components. For example, the computer 510 can comprise one or more networks 540 for communicating with one or more other electronic components.

Following is a non-limiting example of an embodiment of the disclosed technologies. At a floor served by an elevator installation, a user presents an RFID card to a card reader in an elevator lobby of the floor and indicates that the user wishes to travel to the cafeteria. The elevator control of the elevator installation receives, from the card reader, information that is stored on the RFID card (in this case, the information is a user number that is associated with the user). Based partly on the user number, the elevator control unit places an elevator call for the user to the floor where the cafeteria is located. The building control unit receives the user number from the control unit and uses the number to select two records from a profile database. (The two selected records are identified in the database as being associated with the user number.) Based on one of the selected records, the building control unit causes a food order to appear on a cafeteria order system in a cafeteria in the building. The food order is the user's typical lunch meal. Based on the other of the selected records, the building control unit adjusts the temperature settings of the cafeteria according to the user's preferences. Accordingly, the user's food order is ready or almost ready when the user arrives in the cafeteria. The room temperature of the cafeteria is also set to the user's liking. After the user reaches the cafeteria, the user indicates through a computer in the cafeteria that a different lunch meal should be provided the next day. Based on this indication, the building control unit updates the record in the profile database that stores the user's food order preferences. Accordingly, the next time that the user uses the elevator to travel to the cafeteria, the building control unit places a food order based on the revised food order preferences.

In a further non-limiting example of an embodiment of the disclosed technologies, at a floor served by an elevator installation, a user presents an RFID card to a card reader in an elevator lobby of the floor and indicates that the user wishes to travel to a retail store. The elevator control of the elevator installation receives, from the card reader, a user number that is associated with the user. The elevator control unit places an elevator call for the user to the floor where the retail store is located. Also based on the user number, a building control unit selects a record from a profile database. Based on the record, the building control unit informs a computer, which is coupled to the retail store, that the user is traveling to the retail store. As a result of this information, computer coupled to the retail store displays personalized advertising on one or more surfaces in the retail store. Thus, information is presented in the store that is targeted at the user.

In a further non-limiting example of an embodiment of the disclosed technologies, at a floor served by an elevator installation, a user presents an RFID card to a card reader in an elevator lobby of the floor and indicates that the user wishes to travel to a gym. The elevator control of the elevator installation receives, from the card reader, a user number that is associated with the user. The elevator control unit places an elevator call for the user to the floor where the gym is located. Also based on the user number, a building control unit selects a record from a profile database. Based on the record, the building control unit sends a message to the user's personal trainer at the gym, informing the personal trainer of the user's impending arrival. Accordingly, the trainer is prepared to receive the user upon the user's arrival at the gym.

In a further non-limiting example of an embodiment of the disclosed technologies, at a floor served by an elevator installation, a user presents an RFID card to a card reader in an elevator lobby of the floor and indicates that the user wishes to travel to a parking garage in the building. The elevator control of the elevator installation receives, from the card reader, a user number that is associated with the user. The elevator control unit places an elevator call for the user to the floor where the garage is located. Also based on the user number, a building control unit selects a record from a profile database. Based on the record, the building control unit sends a message to a valet at the garage, informing the valet of the user's impending arrival. Accordingly, the valet knows to prepare the user's car.

At least some embodiments of the disclosed technologies can allow building control systems and elevator control systems to work together to address expected and/or actual user needs. For example, the building control system can cause a user's food or drink order to be prepared when the elevator control unit detects that the user is traveling to the cafeteria via the elevator. A portion of the building can thus be "prepared" for the user. Accordingly, the user's needs can be fulfilled more efficiently.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. An elevator control system method, comprising:

receiving, by the elevator control system, identification data from one or more input devices coupled to the elevator control system upon placing a destination call by a user when located within a vicinity of an elevator controlled by the elevator control system, wherein the identification data comprises a unique user identification data, the destination call comprises a request to travel to a destination room in a building, and the destination room being outside of the elevator control system;

identifying, by a building control system, the user based on the unique user identification data, wherein the building control system is configured to receive the unique user identification data from the elevator control system;

identifying, by the elevator control system, the destination room of the user based on the destination call and the unique user identification data;

determining, by the building control system, a personalized building action associated with the user based on the destination room, user specific data specifying user specific preferences, and the unique user identification data, wherein the user specific data is accessible by the building control system and the elevator control system, the user specific data comprises a plurality of records specifying user specific preferences for one or more personalized building actions; and sending, by the building control system, one or more instructions responsive to accessing the user specific data from a database for the personalized building action to one or more building components in the destination room upon detecting the user is traveling to the destination room by the elevator control system.

2. The elevator system method of claim 1, further comprising updating the record for the user in the database based on input provided by the user in the destination room of the building.

3. The elevator system method of claim 1, the personalized building action comprising a food or drink order.

4. The elevator system method of claim 1, the personalized building action comprising a temperature setting for the destination room.

5. The elevator system method of claim 1, the personalized building action comprising a lighting setting for the destination room.

6. The elevator system method of claim 1, the personalized building action comprising a multimedia setting for the destination room.

7. The elevator system method of claim 1, the personalized building action comprising sending a message to a person in the destination room.

8. The elevator system method of claim 1, the personalized building action comprising reserving use of one or more machines for the user.

9. The elevator system method of claim 1, the personalized building action comprising displaying personalized advertising for the user.

10. The elevator system method of claim 1, further comprising creating the record for the user based on a history of preferences for the user.

11. An elevator system for a building, the system comprising:

a computer-based elevator control unit;

a computer-based service provider unit; and a database containing a record for an elevator user, the database being coupled to the elevator control unit and the service provider unit, the elevator control unit being configured to:

receive identification data from one or more input devices coupled to the elevator control system upon placing a destination call by a user when located within a vicinity of an elevator controlled by the elevator control system, wherein the identification data comprises a unique user identification data, the destination call comprising a request to travel to a destination room in a building, and the destination room being outside of the elevator system, identify a destination room in the building to which the elevator user is to travel based on the destination call and the unique user identification data, the service provider unit being programmed to:

receive one or more instructions from the database using the record for the elevator user based on information received for a destination call of the elevator user and the destination room, identify the user based on the unique user identification data, wherein the service provider unit is configured to receive the unique user identification data from the elevator control unit, determine a personalized building action associated with the user based on the destination room, user specific data specifying user specific preferences, and the unique user identification data, wherein the user specific data is accessible by the service provider unit and the elevator control unit, the user specific data comprises a plurality of records specifying user specific preferences for one or more personalized building actions, and perform one or more personalized building actions for the elevator user in the destination room responsive to accessing the user specific data from a database and detecting the user is traveling to the destination room by the elevator control unit.

12. The elevator system of claim 11, the service provider unit being further programmed to update the record for the elevator user based on input provided by the elevator user to the service provider unit.

13. The elevator system of claim 11, the service provider unit comprising:

a computer-based building control unit; and an appliance or an environmental component.

14. The elevator system of claim 11, the database being remotely located from the elevator control unit or the service provider unit.

15. The elevator system of claim 11, the elevator control unit being in a first building and the service provider unit being in a second building.

16. One or more non-transitory computer-readable storage media having encoded thereon instructions that, when executed by one or more processors, cause the one or more processors to perform a method, the method comprising:

receiving, by an elevator control system, identification data from one or more input devices coupled to the elevator control system upon placing a destination call by a user when located within a vicinity of an elevator controlled by the elevator control system, wherein the identification data comprises a unique user identification data, the destination call comprises a request to travel to a destination room in a building, and the destination room being outside of the elevator system;

identifying, by a building control system, the user based on the unique user identification data, wherein the building control system is configured to receive the unique user identification data from the elevator control system identifying , by the elevator control system, the destination room of the user based on the destination call and the unique user identification data;

determining, by the building control system, a personalized building action associated with the user based on the destination room, user specific data specifying user specific preferences, and the unique user identification data, wherein the user specific data is accessible by the building control system and the elevator control system, the user specific data comprises a plurality of records specifying user specific preferences for one or more personalized building actions and at least one of the plurality of records is created using a plurality of historical preferences; and sending, by the building control system, one or more instructions responsive to accessing the user specific data from a database for the personalized building action to one or more building components in the destination room upon determining the user is traveling to the destination room by the elevator control system.

17. The one or more non-transitory computer-readable storage media of claim 16, the method further comprising updating the record for the user in the database based on input provided by the user in the destination room of the building.

18. One or more non-transitory computer-readable storage media having encoded thereon instructions that, when executed by one or more processors, cause the one or more processors to perform a method, the method comprising:

receiving, by an elevator control system, identification data from one or more input devices coupled to the elevator control system upon placing a destination call by a user when located within a vicinity of an elevator controlled by the elevator control system, wherein the identification data comprises a unique user identification data, the destination call comprises a request to travel to a destination room in a building, and the destination room being outside of the elevator system;

identifying, by a building control system, the user based on the unique user identification data, wherein the building control system is configured to receive the unique user identification data from the elevator control system receiving, an indication of a personalized building action for an elevator passenger based on the destination room, user specific data specifying user specific preferences, and the unique user identification data, wherein the user specific data is accessible by the building control system and the elevator control system, the user specific data comprising a plurality of records specifying user specific preferences for one or more personalized building actions;

sending, by the building control system, one or more commands responsive to accessing the user specific data from a database to an environmental component or an appliance in the destination room of the building upon detecting the user is traveling to the destination room by the elevator control system;

receiving update information from the user for the personalized building action; and
sending the update information to the database.

* * * * *